United States Patent
Sheng et al.

(10) Patent No.: US 12,289,432 B2
(45) Date of Patent: Apr. 29, 2025

(54) SHORTCUT COPYING METHOD FOR MULTI-FUNCTION PRINTER AND MULTI-FUNCTION PRINTER USING THE SAME

(71) Applicant: AVISION INC., Hsinchu (TW)

(72) Inventors: Shao-Lan Sheng, Hsinchu (TW); Po-Sheng Shih, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 18/527,419

(22) Filed: Dec. 4, 2023

(65) Prior Publication Data
US 2024/0187541 A1    Jun. 6, 2024

(30) Foreign Application Priority Data
Dec. 5, 2022 (TW) ................. 111146613

(51) Int. Cl.
*H04N 1/387* (2006.01)
*H04N 1/00* (2006.01)

(52) U.S. Cl.
CPC ......... *H04N 1/387* (2013.01); *H04N 1/00822* (2013.01)

(58) Field of Classification Search
CPC ............ H04N 1/387; H04N 1/00822
See application file for complete search history.

(56) References Cited

U.S. PATENT DOCUMENTS

| | | | | |
|---|---|---|---|---|
| 2005/0094226 A1* | 5/2005 | Burch | ........... | H04N 1/2032 358/474 |
| 2012/0268764 A1* | 10/2012 | Sheng | ........... | H04N 1/00076 358/1.13 |
| 2020/0153994 A1* | 5/2020 | Packirisamy | ........... | H04N 1/00474 |

FOREIGN PATENT DOCUMENTS

| | | |
|---|---|---|
| CN | 1613656 A | 5/2005 |
| CN | 102316233 A | 1/2012 |
| TW | 201242791 A | 11/2012 |

* cited by examiner

*Primary Examiner* — Akwasi M Sarpong
*Assistant Examiner* — Michael L Burleson

(57) ABSTRACT

Disclosed are a shortcut copying method for a multi-function printer and a multi-function printer using the same. After a plurality of data is input by an automatic document feeder, the multi-function printer scans first data in the plurality of data and generates a first scanning image. The multi-function printer provides a control interface composed of a front-side scanning and copying option unit, a back-side scanning and copying option unit and a duplex scanning and copying option unit, and determines whether an option execution command is received based on the control interface. When the multi-function printer determines that it receives the option execution command, it continues to scan other data of the plurality of data and generate a second scanning image. By providing the control interface with concise and clear functions, it is convenient for users to select the copying method quickly and conveniently, thereby improving convenience and efficiency of use.

12 Claims, 5 Drawing Sheets

SHORTCUT COPYING METHOD FOR MULTI-FUNCTION PRINTER AND MULTI-FUNCTION PRINTER USING THE SAME

CROSS REFERENCE TO RELATED PRESENT DISCLOSURE

This application claims the priority benefit of Taiwan Patent Application Serial Number 111146613, filed on Dec. 5, 2022, the full disclosure of which is incorporated herein by reference.

BACKGROUND

Technical Field

The present disclosure relates to a shortcut copying method for a multi-function printer and a multi-function printer using the same, in particular to a shortcut copying method for a multi-function printer and a multi-function printer using the same that provide a clearly functional and easily recognizable interface for convenient and quick operations.

Related Art

At present, when service personnel in government agencies, bank counters or related institutions serve the public to handle business, there are often many documents that need to be copied. To reduce the waste of time, the multi-function printers are set up next to the service personnel, so that the service personnel can quickly copy documents to improve service efficiency.

A copying method of a multi-function printer is disclosed in the prior art, wherein a sensing device is disposed at an entrance of a paper feeding tray of an automatic document feeder. The copying method includes the following steps: automatically sensing, by the sensing device, an information medium located in the automatic document feeder (step 101); sending, by the sensing device, a sensing signal to a processor (step 102); starting, by the processor, an image-side option on a console to appear in a standby state (e.g., showing the option on a touch panel, or lighting up or flashing an indicator light of a physical key element when the physical button is touched) to remind a user to make a selection, wherein especially the indicator light is not light up or does not flash when there is no information medium, to save energy and reduce light pollution (step 104); providing instructions for the image-side option to allow a user to select the image side (i.e., the image capturing side) the user wants to operate (step 105); sending an image-side signal of the image-side option selected by the user to the processor (step 106); and activating, by the processor, the corresponding module to perform a copying operation, and continuing to perform image capture or copying operations on subsequent information medium based on the image-side signal (step 107).

In the prior art, the data to be copied is placed in the paper feeding tray of the automatic document feeder, and to allow the user to set the format to be copied through the touch panel (image), when the data is sensed, the processor starts the image-side option on the console (the touch panel) to appear in a standby state and allows the user to select the image capture side. However, the image-side option in the prior art is a screen when the displayed option on the touch panel is in the "standby state". Since the screen comprises other information, such as numeric option buttons, information display areas, and standby state prompt messages, the screen is very complex, and the users need to spend a lot of time identifying the relevant information on the image-side option. Even if the image-side option means that the indicator light of the physical button element lights up or flashes when the physical button element is touched, but the user still needs to take the time to identify or understand the meaning of the indicator light turning on or flashing to determine how to operate. Therefore, there is a problem in the prior art that the operation interface is complicated due to unnecessary interface design or operation process, which leads to inconvenience in operation. Regarding how to make the operation in the prior art more convenient, extremely simplified, and intuitive, there is indeed a need to come up with better solutions.

SUMMARY

In view of the above-mentioned problem in the prior art, the present disclosure discloses a shortcut copying method for a multi-function printer and a multi-function printer using the same. By providing clear and concise operation options on the operation interface, it is convenient for users to select the copying method quickly and conveniently according to their own needs, thereby improving convenience and efficiency of use.

To achieve the above purpose, the present disclosure discloses a shortcut copying method for a multi-function printer, which inputs a plurality of data through an automatic document feeder. The shortcut copying method includes the following steps: scanning first data of the plurality of data and generating a first scanning image; providing a control interface, which is composed of a front-side scanning and copying option unit, a back-side scanning and copying option unit and a duplex scanning and copying option unit; determining whether an option execution command is received according to the control interface; and continuing to scan other data of the plurality of data according to the option execution command when the option execution command is received, and generating a second scanning image.

According to the above technical means, by providing the control interface only composed of the front-side scanning and copying option unit, the back-side scanning and copying option unit and the duplex scanning and copying option unit, there are clear and concise functions in operation, and the users can quickly and easily understand the provided copy functions immediately, without spending time identifying or understanding the copy functions. By providing a more convenient, extremely simplified, and intuitive operation method, it can speed up copying speed and efficiency, thereby improving the convenience and efficiency of use.

To achieve the above purpose, the present disclosure further discloses a multi-function printer, which includes a scanning device having an automatic document feeder and configured to input a plurality of data; a control interface provided for inputting commands and displaying information, and composed of a front-side scanning and copying option unit, a back-side scanning and copying option unit and a duplex scanning and copying option unit; and a processing device connected to the scanning device and the control interface. The scanning device scans first data of the plurality of data and generates a first scanning image, and the processing device stores the first scanning image; the processing device determines whether an option execution command is received through the control interface; when the processing device receives the option execution command, it drives the scanning device to scan other data of the plurality of data according to the option execution command, and generates a second scanning image, and the processing device stores the second scanning image.

According to the above technical means, by providing the control interface only composed of the front-side scanning and copying option unit, the back-side scanning and copying option unit and the duplex scanning and copying option unit, there is a clear, concise, and easily recognizable display, and the users can quickly and easily understand the provided copy functions immediately, without spending time identifying or understanding the copy functions. By providing a more convenient, extremely simplified, and intuitive operation method, it can speed up copying speed and efficiency, thereby improving the convenience and efficiency of use.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

Figure 1:
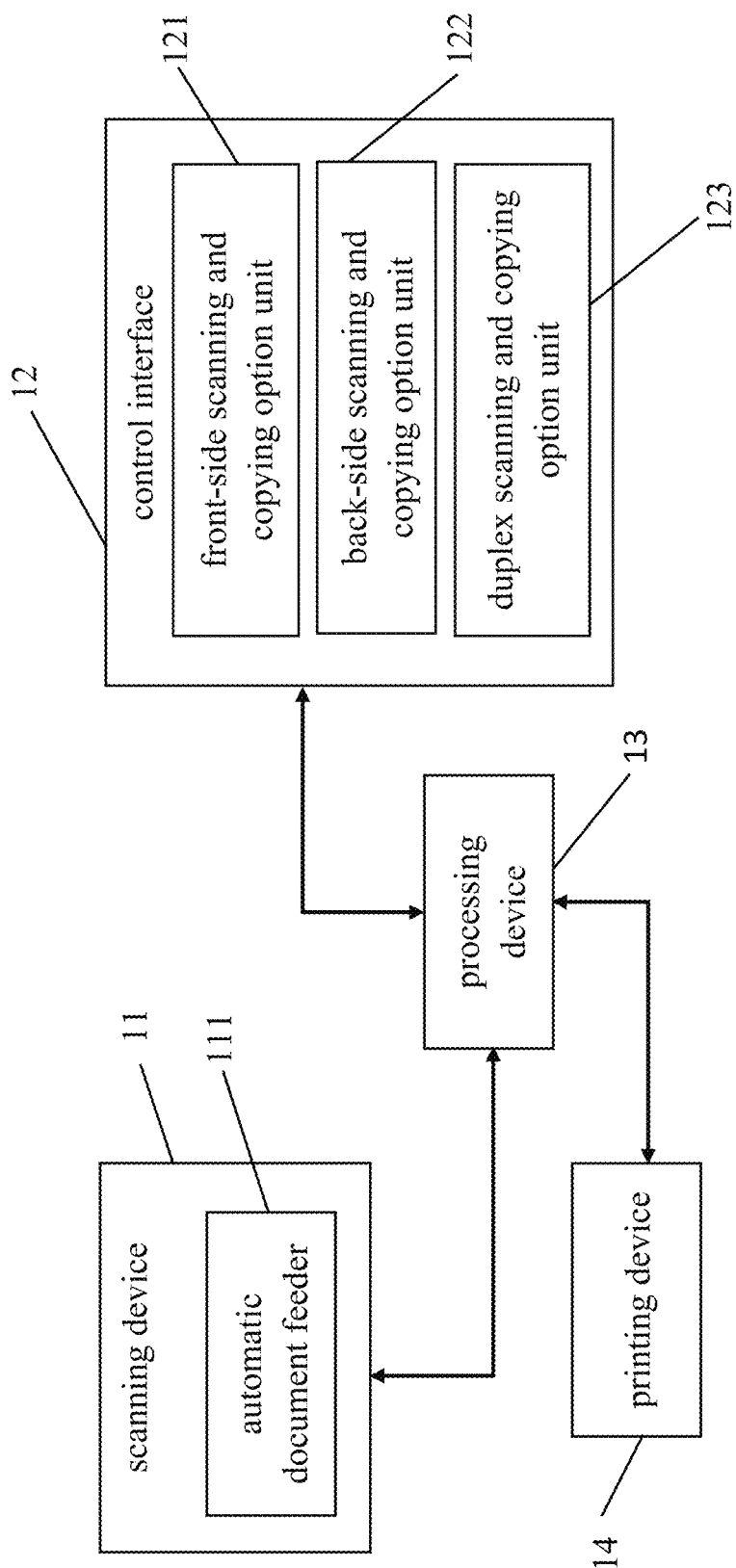
FIG. 1 is an architecture block diagram of a multi-function printer using a shortcut copying method according to an embodiment of the present disclosure.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

Regarding an embodiment of the present disclosure, a multi-function printer can provide fast scanning and/or printing functions. Please refer to FIG. 1, the multi-function printer comprises a scanning device 11, a control interface 12 and a processing device 13. The processing device 13 is connected to the scanning device 11 and the control interface 12 respectively.

The scanning device 11 comprises an automatic document feeder 111. After the automatic document feeder 111 detects that the user places a plurality of data to be scanned and copied thereon, the automatic document feeder 111 automatically feeds the plurality of data into the scanning device 11.

The control interface 12 is provided for inputting commands and displaying information. Specifically, the control interface 12 is controlled by the processing device 13, and the control interface 12 is composed of a front-side scanning and copying option unit 121, a back-side scanning and copying option unit 122, and a duplex scanning and copying option unit 123, so that the operation can be more convenient, extremely simplified, and intuitive. The control interface 12 can be a touch panel, and is only provided with the front-side scanning and copying option unit 121, the back-side scanning and copying option unit 122 and the duplex scanning and copying option unit 123. Each of the front-side scanning and copying option unit 121, the back-side scanning and copying option unit 122 and the duplex scanning and copying option unit 123 can be presented in the form of touch keys. Since the touch panel only provides a virtual key for the front-side scanning and copying function, a virtual key for the back-side scanning and copying function, and a virtual key for the duplex scanning and copying function, there is a very clear, unambiguous, and concise display, allowing the users quickly and conveniently to select the functions they need, without spending time identifying information about various functions. Especially in terms of functions, there are only a front-side option, a back-side option, and a duplex option, which can meet all copying needs, so it can not only effectively improve the efficiency of use, but also be very convenient to use.

The processing device 13 is configured to receive, process or store information or commands from the scanning device 11 and the control interface 12.

Please refer to FIG. 1. In this embodiment, the multi-function printer further comprises a printing device 14 connected to the processing device 13. The printing device 14 is controlled by the processing device 13 to print and output data.

After the user places the plurality of data on the automatic document feeder 111, the scanning device 11 scans first data of the plurality of data and generates a first scanning image. The processing device 13 stores the first scanning image. Then, the processing device 13 makes the control interface 12 provide the front-side scanning and copying option unit 121, the back-side scanning and copying option unit 122, and the duplex scanning and copying option unit 123, so that the user can select the required copying method according to his or her own needs. When the processing device 13 determines that an option execution command is received through the control interface 12 (that is, the user selects the required copy method based on the control interface 12, or after the user presses the corresponding scanning and copying option unit), the processing device 13 continues to drive the scanning device 11 to scan other data of the plurality of data according to the option execution command and generates a second scan image. The processing device 13 stores the second scanning image.

The plurality of data input by the automatic document feeder 111 comprises a plurality of sheets, and the first data of the plurality of data comprises a first sheet of the plurality of sheets. The other data of the plurality of data, which is continuously scanned by the scanning device 11 driven by the processing device 13 according to the option execution command, comprises other sheets except the first sheet in the plurality of sheets. The first scanning image has a front-side image and a back-side image.

When the control interface 12 is the touch panel, the method of providing the control interface 12 comprises displaying the corresponding scanning and copying option unit (e.g., the front-side scanning and copying option unit 121, the back-side scanning and copying option unit 122, or the duplex scanning and copying option unit 123) in the control interface 12 according to whether the first scanning image is a front-side image, a back-side image or a duplex image, thereby intelligently providing the scanning and copying option units by automatically detecting the scanning image. Alternatively, the method of providing the scanning and copying option units of the control interface 12 comprises displaying the front-side scanning and copying option unit 121, the back-side scanning and copying option unit 122, and the duplex scanning and copying option unit 123 on the control interface 12 before the automatic document feeder 111 of the scanning device 11 feeds the sheets, to allow the user to know in advance which scanning and copying functions are supported, thereby improving convenience of use.

Further, the control interface 12 can be a physical control platform, and each of the front-side scanning and copying option unit 121, the back-side scanning and copying option unit 122, and the duplex scanning and copying option unit 123 of the physical control platform comprises a physical button and a light-emitting unit. The light-emitting unit can be arranged around the corresponding physical button, at the bottom of the corresponding physical button, or on the body of the corresponding physical button. The light-emitting unit can be composed of an LED. When the control interface 12 is the above-mentioned touch panel, each of the front-side scanning and copying option unit 121, the back-side scanning and copying option unit 122, and the duplex scanning and copying option unit 123 comprises a touch key. Alternatively, the scanning and copying option unit of the physical control platform comprises a non-physical button and a light-emitting module, the light-emitting module is arranged around or at the bottom of the non-physical button, the non-physical button comprises a biometric recognition unit, and the light-emitting module comprises a light source and a light guide part.

In one embodiment, when the option execution command is generated by pressing the front-side scanning and copying option unit 121 by the user, the option execution command comprises a front-side scanning and copying command. The processing device 13 determines that the option execution command comprises the front-side scanning and copying command, the front-side image of the first scanning image and the second scanning image are integrated to generate an output image. The processing device 13 transmits the generated output image to the printing device 14, and drives the printing device 14 to execute a printing process to output a printed document. That is, the generated output image is output in the form of paper.

In another embodiment, when the option execution command is generated by pressing the back-side scanning and copying option unit 122 by the user, the option execution command comprises a back-side scanning and copying command. The processing device 13 determines that the option execution command comprises the back-side scanning and copying command, and the back-side image of the first scanning image is integrated with the second scanning image to generate an output image. The processing device 13 transmits the generated output image to the printing device 14, and drives the printing device 14 to execute a printing process to output a printed document. That is, the generated output image is output in the form of paper.

In still another embodiment, when the option execution command is generated by pressing the duplex scanning and copying option unit 123 by the user, the option execution command comprises a duplex scanning and copying command. The processing device 13 determines that the option execution command comprises the duplex scanning and copying command, and the front-side image and the back-side image of the first scanning image are integrated with the second scanning image to generate an output image. The processing device 13 transmits the generated output image to the printing device 14, and drives the printing device 14 to execute a printing process to output a printed document. That is, the output image generated by the processing device 13 is output in the form of paper.

In the above embodiments, no matter when the user configures the multi-function printer, or controls the multi-function printer to perform scanning or printing through the control interface 12, once the processing device 13 receives a cancellation command, the processing device 13 will interrupt, terminate, end, or reset the status of the running or executing program of the control interface 12, the scanning device 11 or the processing device 13. The cancellation command can be generated according to the touch on the control interface 12 by the user. In particular, the control interface 12 sends the cancellation command to the processing device 13 according to the touch on the area outside the front-side scanning and copying option unit 121, the back-side scanning and copying option unit 122 and the duplex scanning and copying option unit 123 in the control interface 12 by the user. Alternatively, the cancellation instruction can be generated according to the removal of the plurality of data from the automatic document feeder 111 of the scanning device 11 by the user, and the scanning device 11 sends the cancellation command to the processing device 13. Thus, the user can immediately re-adjust the operational requirements for sheet feeding and scanning in a fast and convenient manner to avoid unnecessary waste.

By providing the control interface 12 only composed of the front-side scanning and copying option unit 121, the back-side scanning and copying option unit 122 and the duplex scanning and copying option unit 123 in the multi-function printer of the present disclosure, there is a clear, concise, and easily recognizable display, and the users can quickly and easily understand the provided copy functions immediately, without spending time identifying or understanding the copy functions. By providing a more convenient, extremely simplified, and intuitive operation method, it can speed up copying speed and efficiency, thereby improving the convenience and efficiency of use.

Figure 2:
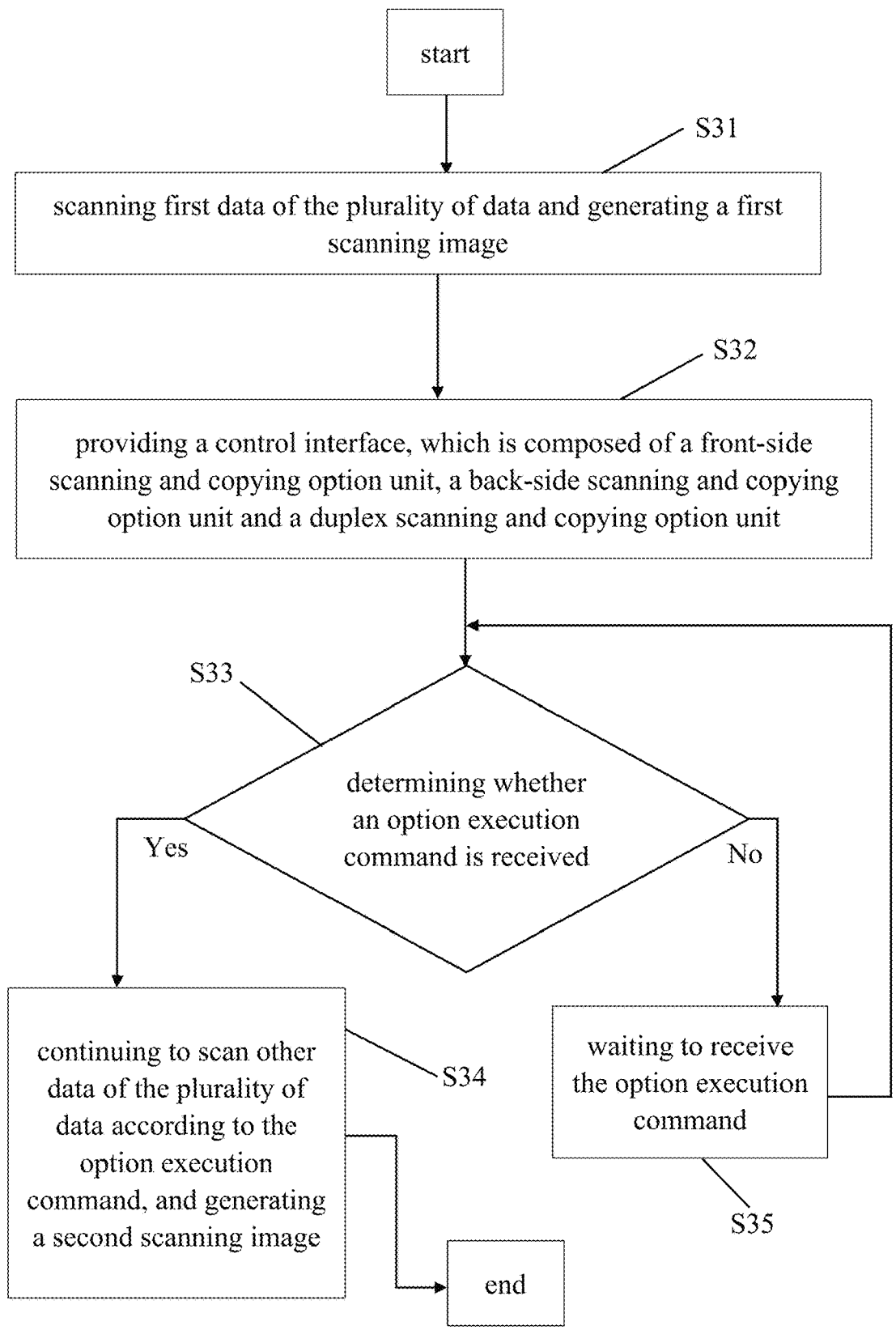
FIG. 2 is a flow chart of a shortcut copying method for a multi-function printer according to a first embodiment of the present disclosure.

Based on the above content, please refer to FIG. 1 and FIG. 2, a shortcut copying method for the multi-function printer can be further summarized, wherein a plurality of data is input through an automatic document feeder 111. The shortcut copying method comprises the following steps: scanning, by a scanning device 11, first data of the plurality of data and generating a first scanning image (S31); providing a control interface 12, which is composed of a front-side scanning and copying option unit 121, a back-side scanning and copying option unit 122 and a duplex scanning and copying option unit 123 (S32); determining, by a processing device 13, whether an option execution command is received according to the control interface 12 (S33); continuing, by a processing device 13, to scan other data of the plurality of data according to the option execution command when the option execution command is received, and generating a second scanning image (S34).

In this embodiment, when the processing device 13 determines that the option execution command is not received, the shortcut copying method further comprises the following step: waiting to receive the option execution command (S35), and returning to execute the step (S33) of determining, by a processing device 13, whether an option execution command is received according to the control interface 12, to continue to determine whether the option execution command is received.

In this embodiment, the plurality of data comprises a plurality of sheets, and the first data of the plurality of data comprises a first sheet of the plurality of sheets. The other data of the plurality of data comprises other sheets except the first sheet in the plurality of sheets. The first scanning image has a front-side image and a back-side image.

Figure 3:
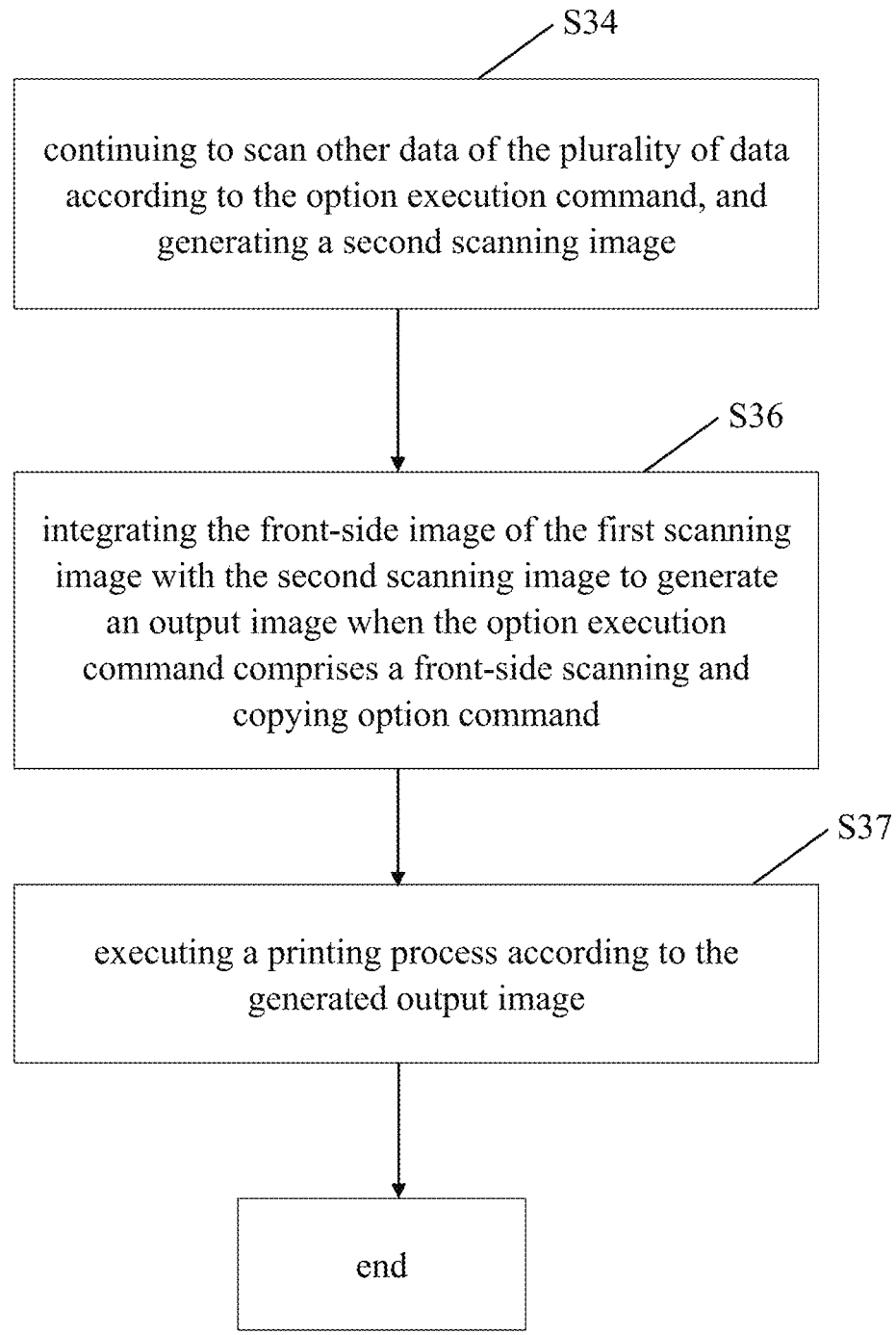
FIG. 3 is a flow chart of a shortcut copying method for a multi-function printer according to a second embodiment of the present disclosure.

In one embodiment, please refer to FIG. 3, after the step (S34) of continuing, by the processing device 13, to scan other data of the plurality of data according to the option execution command when the option execution command is received, and generating the second scanning image, the shortcut copying method further comprises the following steps: integrating the front-side image of the first scanning image with the second scanning image to generate an output image when the option execution command comprises a front-side scanning and copying option command (S36); and executing a printing process according to the generated output image (S37).

Figure 4:
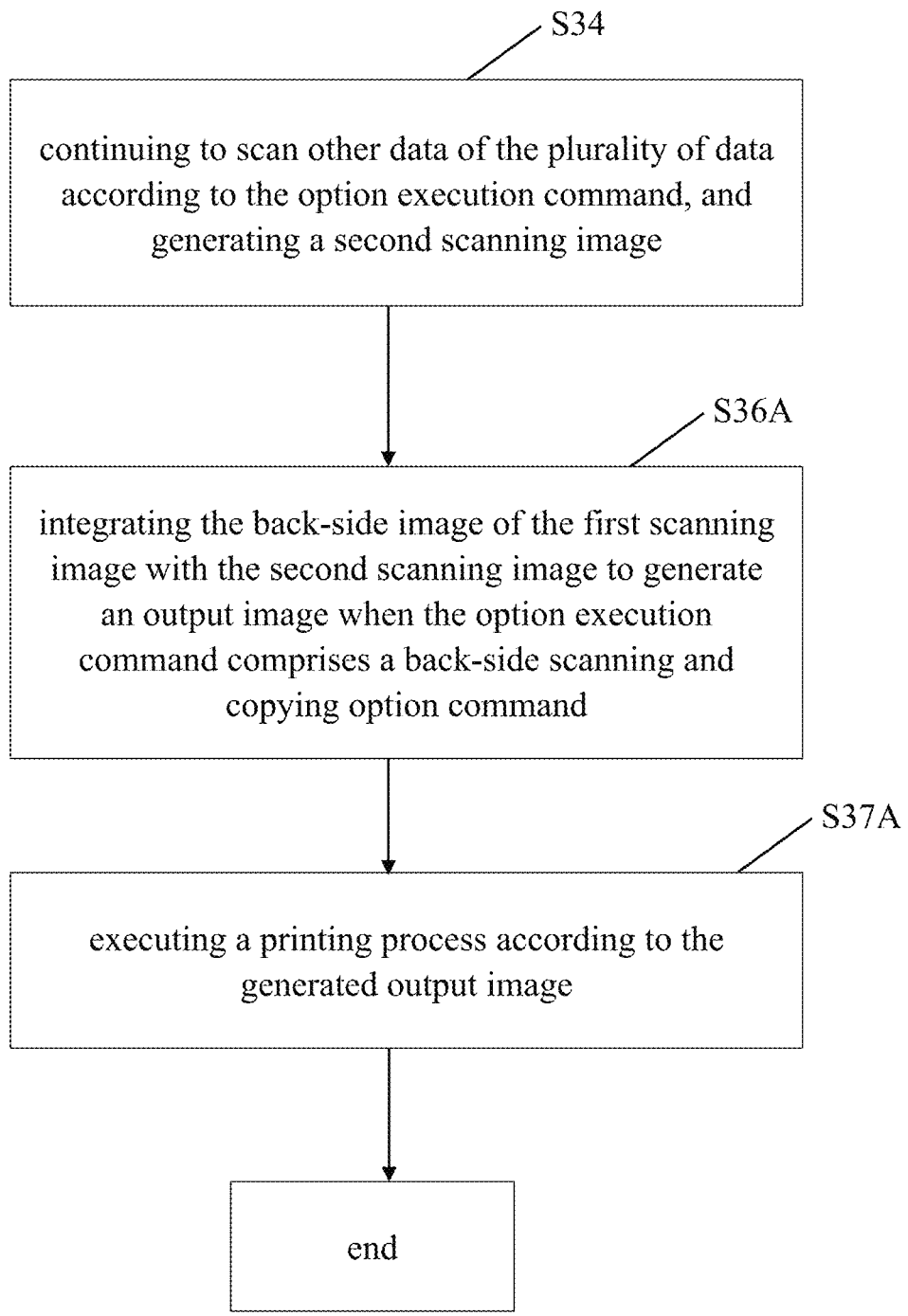
FIG. 4 is a flow chart of a shortcut copying method for a multi-function printer according to a third embodiment of the present disclosure.

In another embodiment, please refer to FIG. 4, after the step (S34) of continuing, by the processing device 13, to scan other data of the plurality of data according to the option execution command when the option execution command is received, and generating the second scanning image, the shortcut copying method further comprises the following steps: integrating the back-side image of the first scanning image with the second scanning image to generate an output image when the option execution command comprises a back-side scanning and copying option command (S36A); and executing a printing process according to the generated output image (S37A).

Figure 5:
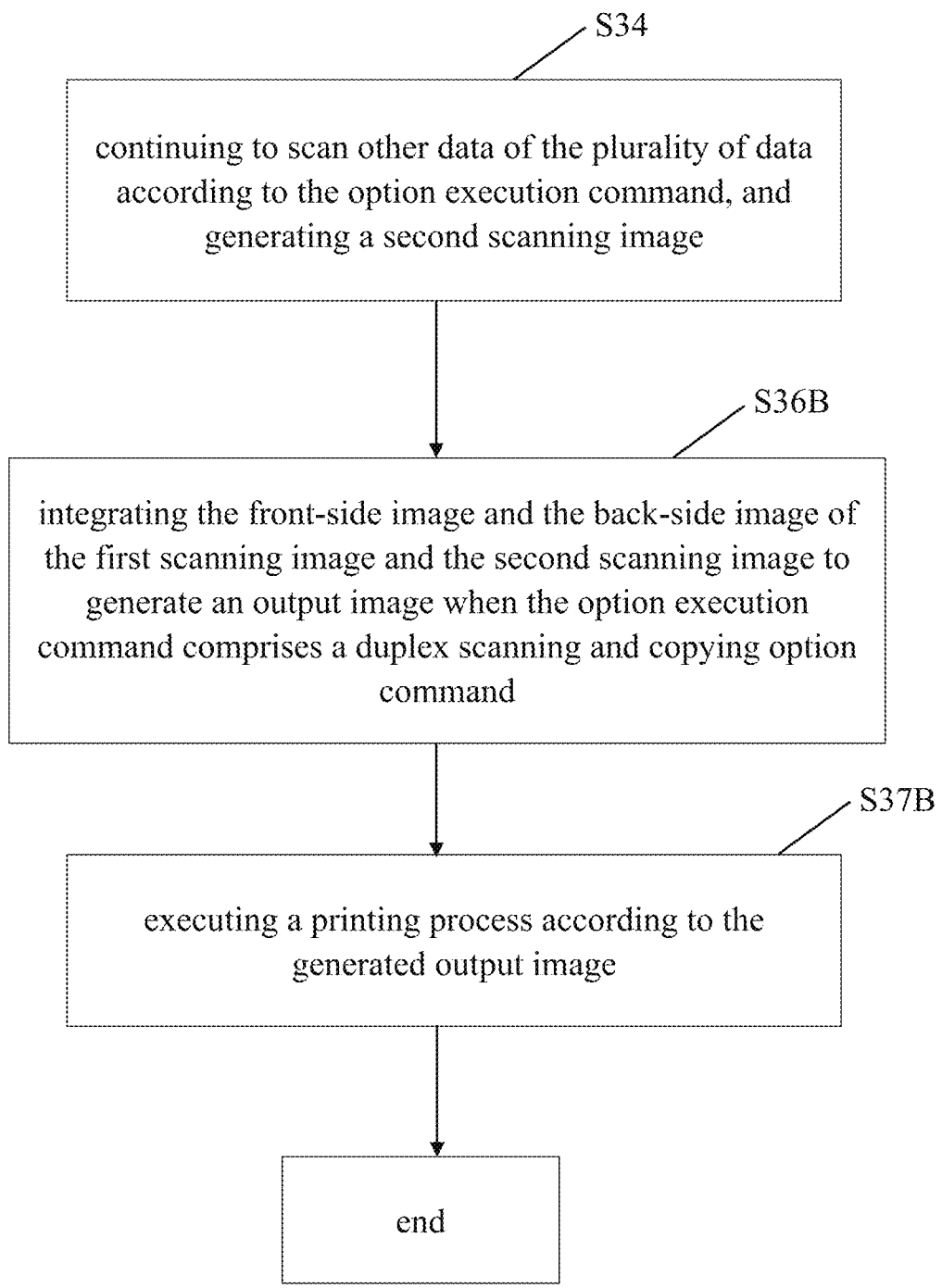
FIG. 5 is a flow chart of a shortcut copying method for a multi-function printer according to a fourth embodiment of the present disclosure.

In still another embodiment, please refer to FIG. 5, after the step (S34) of continuing, by the processing device 13, to scan other data of the plurality of data according to the option execution command when the option execution command is received, and generating the second scanning image, the shortcut copying method further comprises the following steps: integrating the front-side image and the back-side image of the first scanning image and the second scanning image to generate an output image when the option execution command comprises a duplex scanning and copying option command (S36B); and executing a printing process according to the generated output image (S37B).

According to the above content, by providing three option units of the control interface 12 only composed of the front-side scanning and copying option unit 121, the back-side scanning and copying option unit 122, and the duplex scanning and copying option unit 123, it is not only simple in function, but also clear and concise in function, making it convenient for users to quickly and conveniently select the functions they need, so that the users do not need to spend time identifying or understanding the corresponding functions when they are in a hurry, thereby providing a user-friendly design. In addition, although there are only the front-side copying function, the back-side copying function and the duplex copying function, it can meet all copying needs and greatly simplify the operation complexity. By providing a more convenient, extremely simplified, and intuitive operation method, it can speed up copying speed and efficiency, thereby improving the convenience and efficiency of use.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A shortcut copying method for a multi-function printer, which inputs a plurality of data through an automatic document feeder, the shortcut copying method comprising the following steps:
   scanning first data of the plurality of data and generating a first scanning image;
   providing a control interface, which is composed of a front-side scanning and copying option unit, a back-side scanning and copying option unit and a duplex scanning and copying option unit;
   determining whether an option execution command is received according to the control interface; and
   continuing to scan other data of the plurality of data according to the option execution command when the option execution command is received, and generating a second scanning image, wherein when the option execution command is generated by the front-side scanning and copying option unit, the option execution command comprises a front-side scanning and copying option command;
   integrating a front-side image of the first scanning image with the second scanning image to generate an output image when the option execution command comprising the front-side scanning and copying option command.

2. The shortcut copying method for the multi-function printer according to claim 1, wherein the plurality of data input by the automatic document feeder comprises a plurality of sheets; the first data of the plurality of data comprises a first sheet of the plurality of sheets; the other data of the plurality of data, which is continuously scanned according to the option execution command, comprises other sheets except the first sheet in the plurality of sheets.

3. The shortcut copying method for the multi-function printer according to claim 2, wherein the first scanning image has a front-side image and a back-side image.

4. The shortcut copying method for the multi-function printer according to claim 1, wherein after the output image is generated, a printing process is further executed.

5. A shortcut copying method for the multi-function printer, which inputs a plurality of data through an automatic document feeder, the shortcut co the following steps:
   scanning first data of the plurality of data and generating a first scanning image;
   providing a control interface, which is composed of a back-side scanning and copying option unit;
   determining whether an option execution command is received according to the control interface; and
   continuing to scan other data of the plurality of data according to the option execution command when the option execution command is received, and generating a second scanning image when the option execution command is generated by the back-side scanning and copying option unit, the option execution command comprises a back-side scanning and copying option command;

integrating the back-side image of the first scanning image with the second scanning image to generate the output image when the option execution command comprises the back-side scanning and copying option command.

6. The shortcut copying method for the multi-function printer according to claim 5, wherein after the output image is generated, a printing process is further executed.

7. A multi-function printer, comprising:
a scanning device having an automatic document feeder and configured to input a plurality of data;
a control interface provided for inputting commands and displaying information, wherein the control interface is composed of a front-side scanning and copying option unit, wherein the front-side scanning and copying option unit generates an option execution command, and the option execution command comprises a front side scanning and copying option command; and
a processing device connected to the scanning device and the control interface;
wherein the scanning device scans first data of the plurality of data and generates a first scanning image, and the processing device stores the first scanning image; the processing device determines whether the option execution command is received through the control interface; when the processing device receives the option execution command, it drives the scanning device to scan other data of the plurality of data according to the option execution command, and generates a second scanning image, the processing device stores the second scanning image, and integrates a front-side image of the first scanning image with the second scanning image to generate an output image when the option execution command comprising the front-side scanning and copying option command.

8. The multi-function printer according to claim 7, wherein the plurality of data input by the automatic document feeder comprises a plurality of sheets; the first data of the plurality of data comprises a first sheet of the plurality of sheets; the other data in the plurality of data, which is continuously scanned according to the option execution command, comprises other sheets except the first sheet in the plurality of sheets.

9. The multi-function printer according to claim 8, wherein the first scanning image has a front-side image and a back-side image.

10. The multi-function printer according to claim 7, further comprising a printing device connected to the processing device, wherein the processing device transmits the output image to the printing device, and drives the printing device to execute a printing process to output a scanned document.

11. A multi-function printer, comprising:
a scanning device having an automatic document feeder and configured to input a plurality of data;
a control interface provided for inputting commands and displaying information, wherein the control interface is composed of a back side scanning and copying option unit, wherein the back-side scanning and copying option unit generates an option execution command, and the option execution command comprises a back-side scanning and copying option command; and
a processing device connected to the scanning device and the control interface;
wherein the scanning device scans first data of the plurality of data and generates a first scanning image, and the processing device stores the first scanning image; the processing device determines whether the option execution command is received through the control interface; when the processing device receives the option execution command, it drives the scanning device to scan other data of the plurality of data according to the option execution command, and generates a second scanning image, the processing device stores the second scanning image, and integrates a back-side image of the first scanning image with the second scanning image to generate an output image when the option execution command comprising the back-side scanning and copying option command.

12. The multi-function printer according to claim 11, further comprising a printing device connected to the processing device, wherein the processing device transmits the output image to the printing device, and drives the printing device to execute a printing process to output a scanned document.

* * * * *